(12) United States Patent
Lee

(10) Patent No.: US 11,957,179 B2
(45) Date of Patent: Apr. 16, 2024

(54) AEROSOL GENERATING DEVICE AND OPERATION METHOD THEREOF

(71) Applicant: KT&G CORPORATION, Daejeon (KR)

(72) Inventor: Jae Min Lee, Gyeonggi-do (KR)

(73) Assignee: KT&G CORPORATION, Daejeon (KR)

( * ) Notice: Subject to any disclaimer, the term of this patent is extended or adjusted under 35 U.S.C. 154(b) by 875 days.

(21) Appl. No.: 16/975,627

(22) PCT Filed: May 14, 2020

(86) PCT No.: PCT/KR2020/006325
§ 371 (c)(1),
(2) Date: Aug. 25, 2020

(87) PCT Pub. No.: WO2020/231194
PCT Pub. Date: Nov. 19, 2020

(65) Prior Publication Data
US 2023/0098940 A1    Mar. 30, 2023

(30) Foreign Application Priority Data
May 16, 2019    (KR) .................. 10-2019-0057599

(51) Int. Cl.
A24F 47/00    (2020.01)
A24F 40/57    (2020.01)
G05D 23/19    (2006.01)
H05B 1/02    (2006.01)

(52) U.S. Cl.
CPC ......... *A24F 40/57* (2020.01); *G05D 23/1917* (2013.01)

(58) Field of Classification Search
None
See application file for complete search history.

(56) References Cited

U.S. PATENT DOCUMENTS

| | | | |
|---|---|---|---|
| 9,423,152 | B2 | 8/2016 | Ampolini et al. |
| 9,532,605 | B2 | 1/2017 | Yamada et al. |
| 10,448,670 | B2 | 10/2019 | Talon et al. |
| 10,602,781 | B2 | 3/2020 | Nakano et al. |
| 10,869,503 | B2 | 12/2020 | Yamada et al. |
| 10,932,495 | B2 | 3/2021 | Reevell |

(Continued)

FOREIGN PATENT DOCUMENTS

| | | |
|---|---|---|
| CN | 104757705 A | 7/2015 |
| CN | 108851232 A | 11/2018 |

(Continued)

OTHER PUBLICATIONS

Extended European Search Report dated Nov. 4, 2021 in European Application No. 20763973.3.

(Continued)

*Primary Examiner* — Dennis R Cordray
(74) *Attorney, Agent, or Firm* — Sughrue Mion, PLLC

(57) ABSTRACT

Disclosed is an aerosol generating device including a heater that heats an aerosol generating material and a controller that controls power to be supplied to the heater. The controller calculates a first power amount indicating a power amount used by the heater during a preset first time period after a heating operation of the heater is started, and controls the heating operation of the heater based on whether the first power amount is greater than or equal to a preset reference power amount.

13 Claims, 6 Drawing Sheets

(56) References Cited

U.S. PATENT DOCUMENTS

| | | |
|---|---|---|
| 2015/0053220 A1 | 2/2015 | Levy et al. |
| 2016/0053988 A1 | 2/2016 | Quintana |
| 2016/0213066 A1 | 7/2016 | Zitzke et al. |
| 2016/0309780 A1 | 10/2016 | Chen et al. |
| 2017/0042251 A1 | 2/2017 | Yamada et al. |
| 2017/0258137 A1 | 9/2017 | Smith et al. |
| 2019/0274361 A1 | 9/2019 | Bilat et al. |
| 2019/0373959 A1 | 12/2019 | Nakano et al. |
| 2020/0352244 A1 | 11/2020 | Lim et al. |
| 2020/0359696 A1 | 11/2020 | Lim |

FOREIGN PATENT DOCUMENTS

| | | |
|---|---|---|
| CN | 109475191 A | 3/2019 |
| EP | 3348154 A1 | 7/2018 |
| JP | 2019-509732 A | 4/2019 |
| KR | 10-2014-0121381 A | 10/2014 |
| KR | 10-2015-0130458 A | 11/2015 |
| KR | 10-2016-0137627 A | 11/2016 |
| KR | 10-2018-0070440 A | 6/2018 |
| WO | 2012/026963 A2 | 3/2012 |
| WO | 2015/166952 A1 | 11/2015 |
| WO | 2017/182249 A1 | 10/2017 |
| WO | 2017/207416 A1 | 12/2017 |
| WO | 2018/114849 A1 | 6/2018 |
| WO | 2018/198152 A1 | 11/2018 |
| WO | 2018/198153 A1 | 11/2018 |
| WO | 2019/068821 A1 | 4/2019 |
| WO | 2019/088589 A2 | 5/2019 |

OTHER PUBLICATIONS

Office Action dated Nov. 9, 2021 in Japanese Application No. 2020-546096.

International Search Report dated Jan. 7, 2021 from the Korean Intellectual Property Office in Application No. PCT/KR2020/006325.

Communication dated Dec. 24, 2020 from the Korean Intellectual Property Office in Application No. 10-2019-0057599.

Chinese Office Action dated Apr. 26, 2023 in Chinese Application No. 202080001753.8.

[Figure 1]
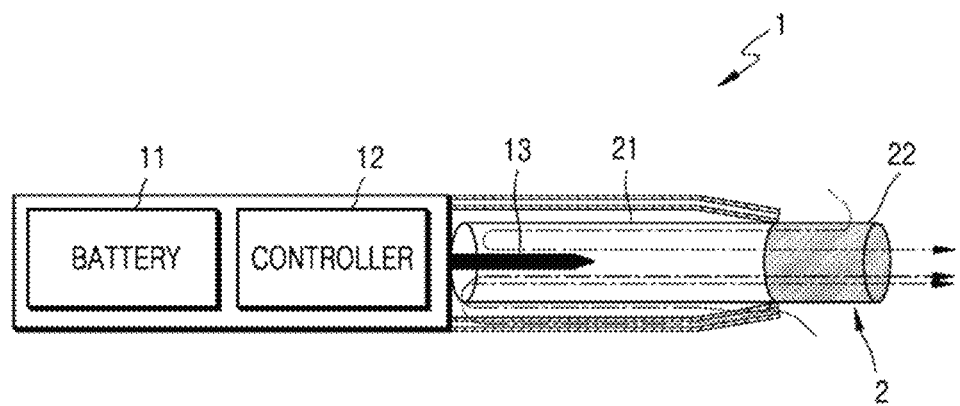
[Figure 2]
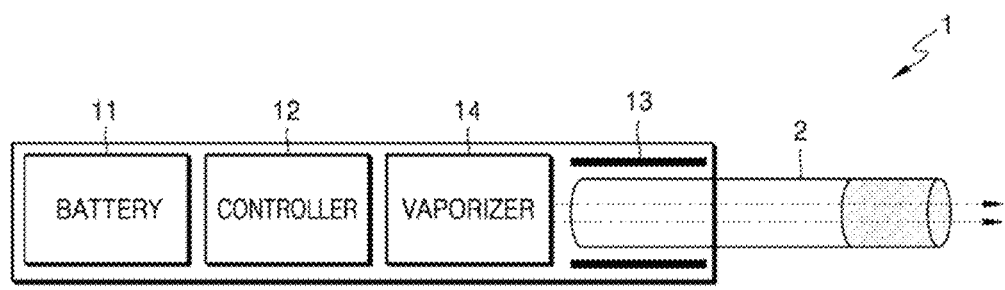

[Figure 3]
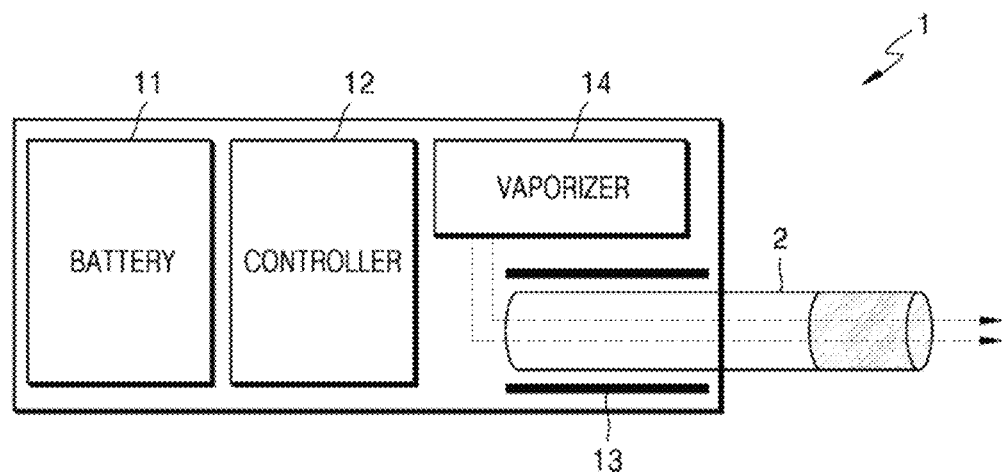
[Figure 4]
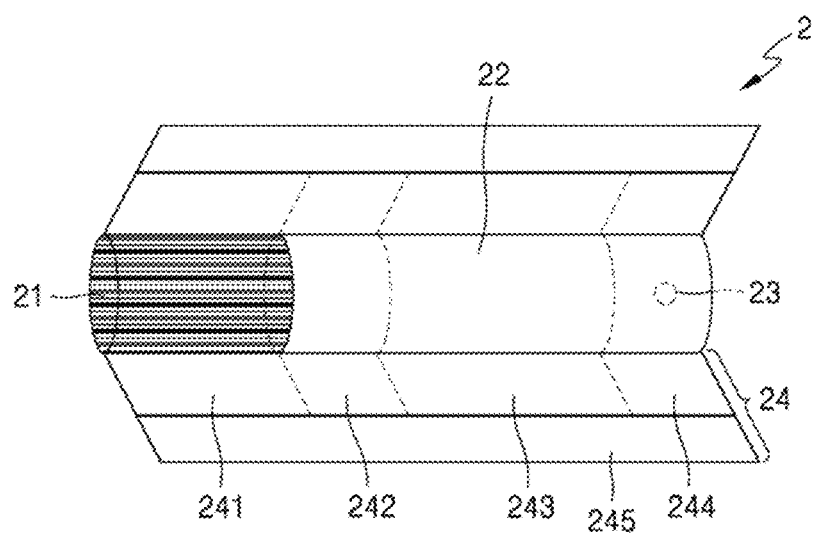

[Figure 5]
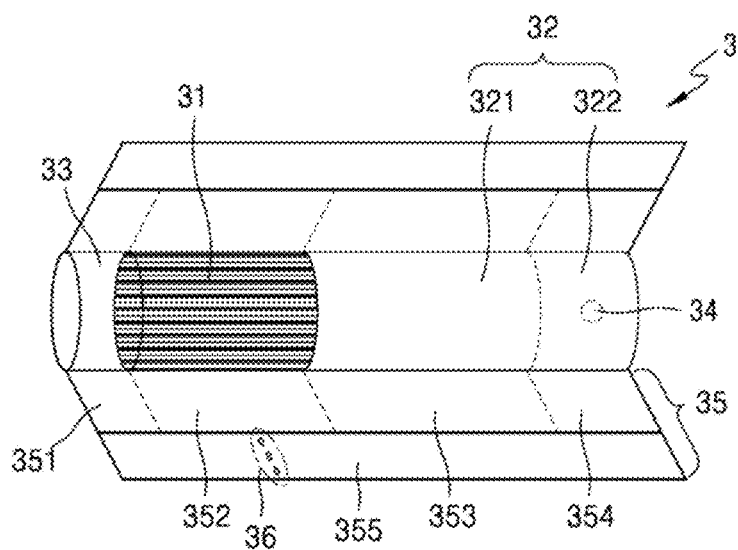
[Figure 6]
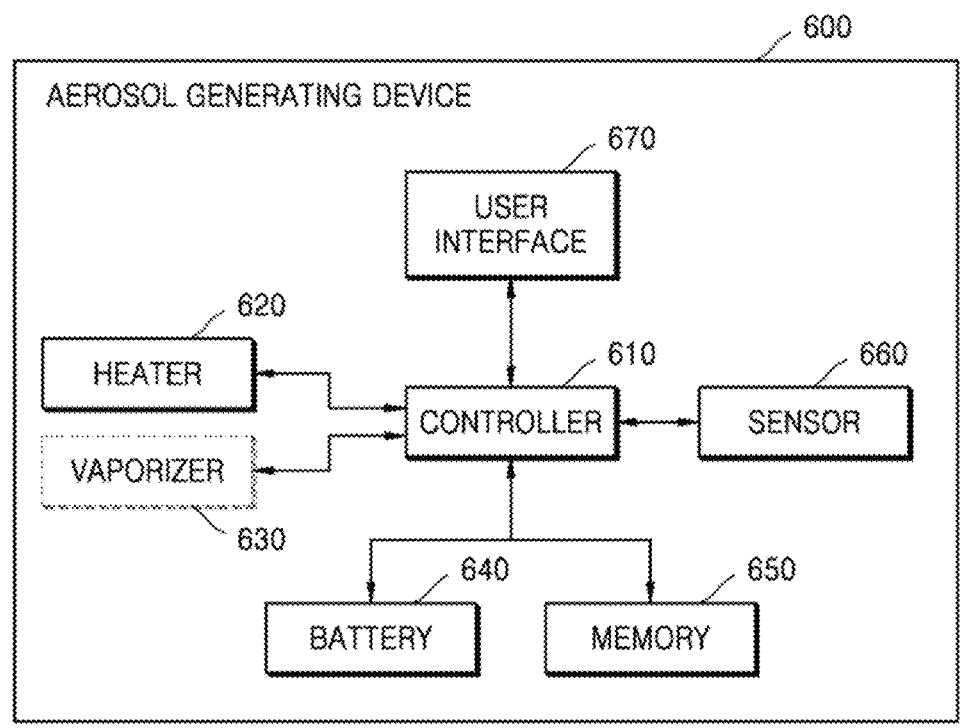

[Figure 7]
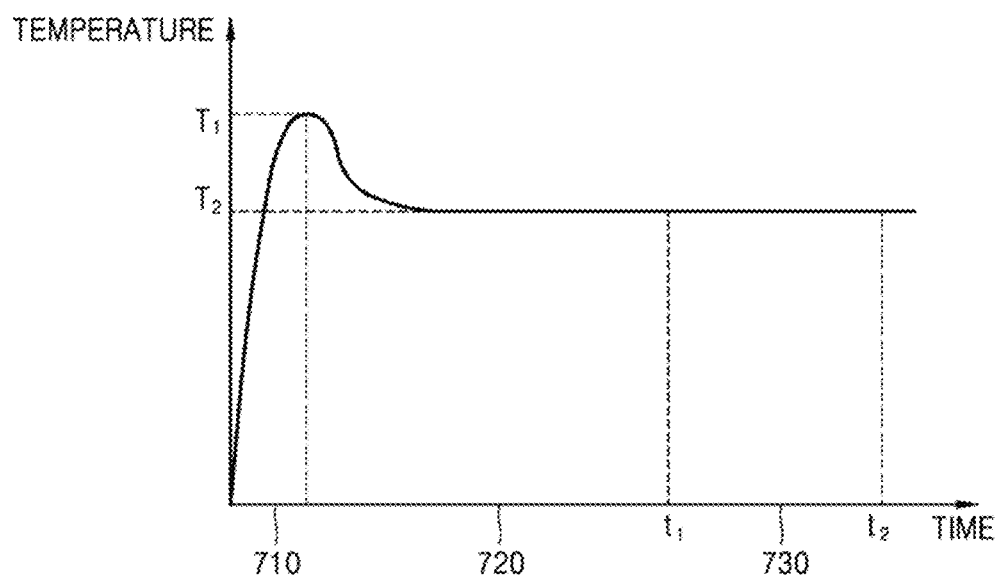
[Figure 8]
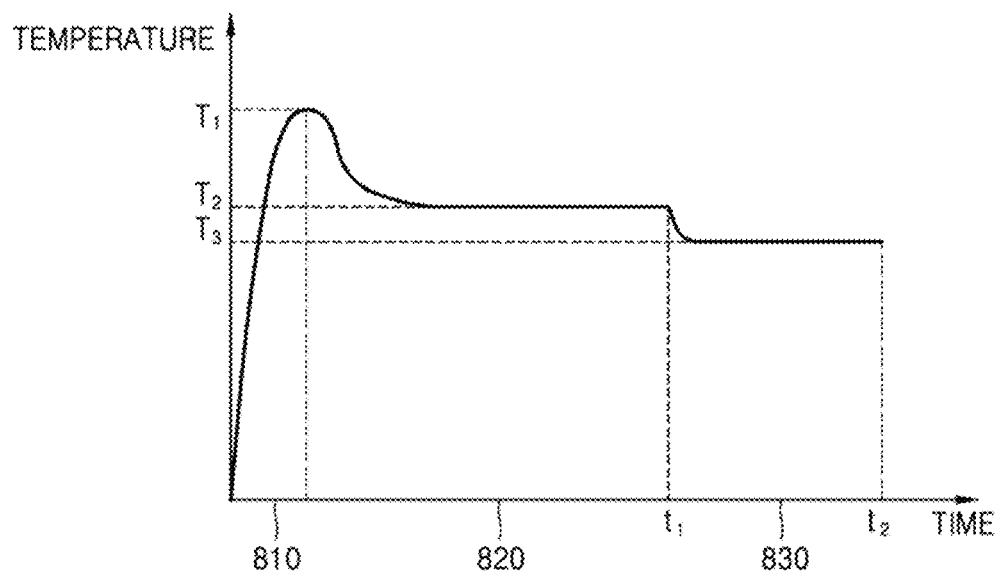

【Figure 9】
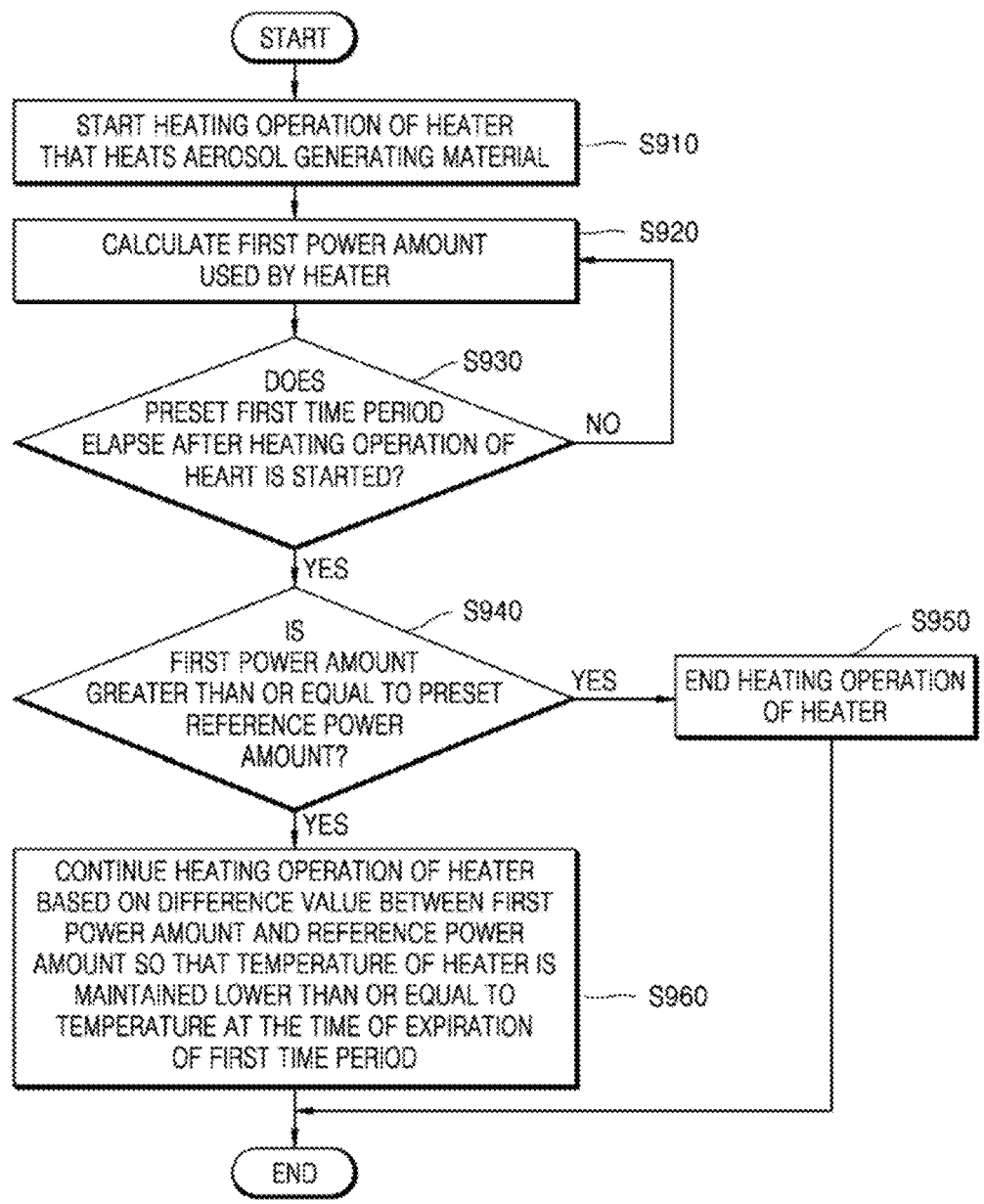

[Figure 10]
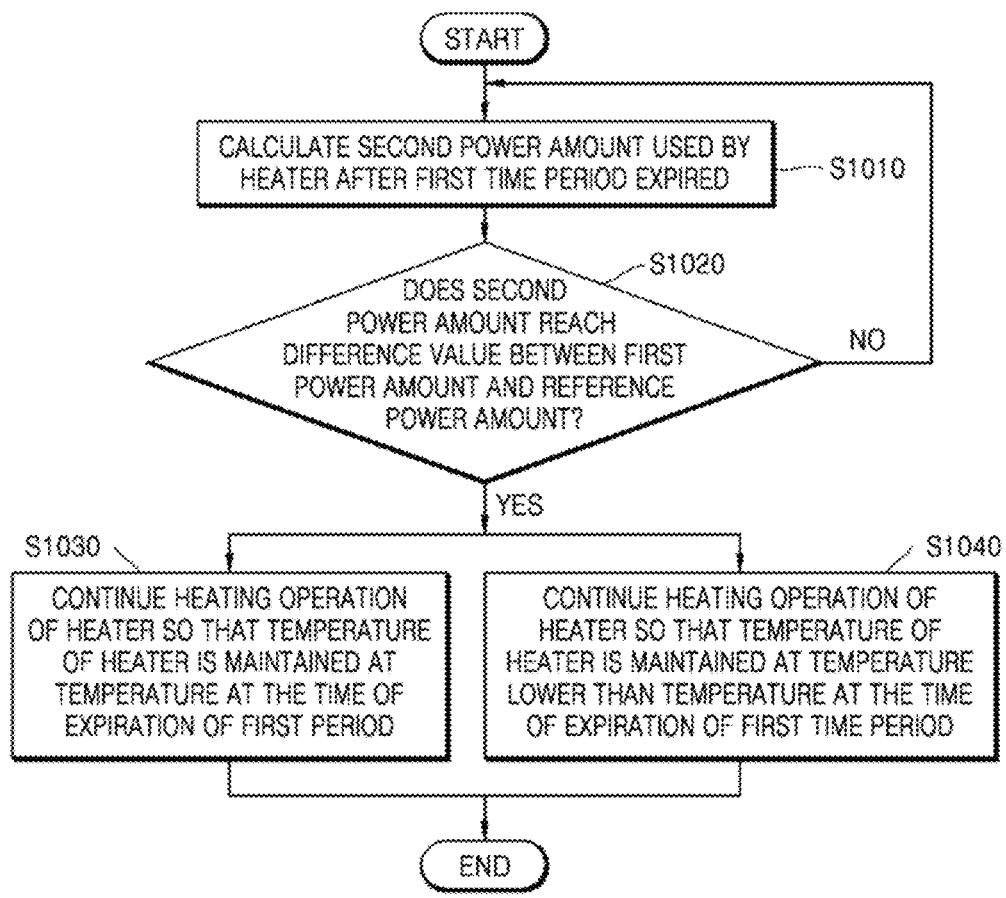

AEROSOL GENERATING DEVICE AND OPERATION METHOD THEREOF

TECHNICAL FIELD

The present disclosure relates to an aerosol generating device and an operation method thereof.

BACKGROUND ART

Recently, the demand for an alternative to traditional cigarettes has been increased. For example, there is growing demand for an aerosol generating device that generates aerosol by heating an aerosol generating material, rather than by combusting cigarettes. Accordingly, research into a heating-type cigarette and a heating-type aerosol generating device has been actively conducted.

In general, an operation of an aerosol generating device is controlled based on the number of puffs of a user and an operation time. In the case of operating based on the number of puffs, heating is ended when the accumulated number of puffs reaches a preset number. Thus, a smoking time may be shorter than the user desires. Moreover, in the case of operating based on the operation time, heating is ended as the preset time elapses regardless the number of puffs Thus, a cigarette may be discarded upon end of the heating even though the aerosol generating material in the cigarette has not been exhausted.

DISCLOSURE

Technical Solution

Embodiments of the present disclosure provide an aerosol generating device and an operation method thereof that may allow a smoking operation of a user to the maximum extent possible.

A technical problem to be solved by the present embodiment is not limited to the technical problem described above, and other technical problems may be inferred from the following embodiments.

As technical means for solving the technical problems described above, an aerosol generating device according to one aspect of the present disclosure includes a heater that heats an aerosol generating material; and a controller that controls power to be supplied to the heater, wherein the controller calculates a first power amount indicating a power amount used by the heater during a preset first time period after a heating operation of the heater is started, and controls the heating operation of the heater based on whether the first power amount is greater than or equal to a preset reference power amount.

Advantageous Effects

According to embodiments of the present disclosure, heating of a heater is controlled by considering the power amount consumed by the heater in addition to the operation time of an aerosol generating device, and thus, a sufficient smoking time may be provided to a user to increase satisfaction of smoking.

DESCRIPTION OF DRAWINGS

FIGS. 1 to 3 are views illustrating examples in which a cigarette is inserted into an aerosol generating device;

FIGS. 4 and 5 are views illustrating examples of a cigarette;

FIG. 6 is a block diagram illustrating a hardware configuration of an aerosol generating device according to an embodiment;

FIGS. 7 and 8 are example diagrams of a temperature profile of a heater according to an embodiment; and FIGS. 9 and 10 are flowcharts illustrating an operation method of an aerosol generating device, according to an embodiment.

BEST MODE

An aerosol generating device according to one aspect of the present disclosure includes a heater that heats an aerosol generating material; and a controller configured to: calculate a first power amount indicating a power amount used by the heater during a preset first time period after a heating operation of the heater is started, and control the heating operation of the heater based on whether the first power amount is greater than or equal to a preset reference power amount.

An operation method of an aerosol generating device according to another aspect of the present disclosure starting a heating operation of a heater that heats an aerosol generating material; calculating a first power amount indicating a power amount used by the heater during a preset first time period after the heating operation of the heater is started; and controlling the heating operation of the heater based on whether the first power amount is greater than or equal to a preset reference power amount.

A computer-readable recording medium according to another aspect of the present disclosure includes a program that is recorded therein and causes a computer to perform the operation method of the aerosol generating device.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which example embodiments of the present disclosure are illustrated such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIGS. 1 through 3 are diagrams illustrating examples in which a cigarette is inserted into an aerosol generating device.

Referring to FIG. 1, the aerosol generating device 1 may include a battery 11, a controller 12, and a heater 13. Referring to FIGS. 2 and 3, the aerosol generating device 1 may further include a vaporizer 14. Also, the cigarette 2 may be inserted into an inner space of the aerosol generating device 1.

FIGS. 1 through 3 illustrate components of the aerosol generating device 1, which are related to the present embodiment. Therefore, it will be understood by one of ordinary skill in the art related to the present embodiment that other components may be further included in the aerosol generating device 1, in addition to the components illustrated in FIGS. 1 through 3.

Also, FIGS. 2 and 3 illustrate that the aerosol generating device 1 includes the heater 13. However, as necessary, the heater 13 may be omitted.

FIG. 1 illustrates that the battery 11, the controller 12, and the heater 13 are arranged in series. Also, FIG. 2 illustrates that the battery 11, the controller 12, the vaporizer 14, and the heater 13 are arranged in series. Also, FIG. 3 illustrates that the vaporizer 14 and the heater 13 are arranged in parallel. However, the internal structure of the aerosol generating device 1 is not limited to the structures illustrated in FIGS. 1 through 3. In other words, according to the design of the aerosol generating device 1, the battery 11, the controller 12, the heater 13, and the vaporizer 14 may be differently arranged.

When the cigarette 2 is inserted into the aerosol generating device 1, the aerosol generating device 1 may operate the heater 13 and/or the vaporizer 14 to generate aerosol from the cigarette 2 and/or the vaporizer 14. The aerosol generated by the heater 13 and/or the vaporizer 14 is delivered to a user by passing through the cigarette 2.

As necessary, even when the cigarette 2 is not inserted into the aerosol generating device 1, the aerosol generating device 1 may heat the heater 13.

The battery 11 may supply power to be used for the aerosol generating device 1 to operate. For example, the battery 11 may supply power to heat the heater 13 or the vaporizer 14, and may supply power for operating the controller 12. Also, the battery 11 may supply power for operations of a display, a sensor, a motor, etc. mounted in the aerosol generating device 1.

The controller 12 may generally control operations of the aerosol generating device 1. In detail, the controller 12 may control not only operations of the battery 11, the heater 13, and the vaporizer 14, but also operations of other components included in the aerosol generating device 1. Also, the controller 12 may check a state of each of the components of the aerosol generating device 1 to determine whether or not the aerosol generating device 1 is able to operate.

The controller 12 may include at least one processor. A processor can be implemented as an array of a plurality of logic gates or can be implemented as a combination of a microprocessor and a memory in which a program executable in the microprocessor is stored. It will be understood by one of ordinary skill in the art that the processor can be implemented in other forms of hardware.

The heater 13 may be heated by the power supplied from the battery 11. For example, when the cigarette 2 is inserted into the aerosol generating device 1, the heater 13 may be located outside the cigarette 2. Thus, the heated heater 13 may increase a temperature of an aerosol generating material in the cigarette 2.

The heater 13 may include an electro-resistive heater. For example, the heater 13 may include an electrically conductive track, and the heater 13 may be heated when currents flow through the electrically conductive track. However, the heater 13 is not limited to the example described above and may include all heaters which may be heated to a desired temperature. Here, the desired temperature may be pre-set in the aerosol generating device 1 or may be set as a temperature desired by a user.

As another example, the heater 13 may include an induction heater. In detail, the heater 13 may include an electrically conductive coil for heating a cigarette in an induction heating method, and the cigarette may include a susceptor which may be heated by the induction heater.

For example, the heater 13 may include a tube-type heating element, a plate-type heating element, a needle-type heating element, or a rod-type heating element, and may heat the inside or the outside of the cigarette 2, according to the shape of the heating element.

Also, the aerosol generating device 1 may include a plurality of heaters 13. Here, the plurality of heaters 13 may be inserted into the cigarette 2 or may be arranged outside the cigarette 2. Also, some of the plurality of heaters 13 may be inserted into the cigarette 2 and the others may be arranged outside the cigarette 2. In addition, the shape of the heater 13 is not limited to the shapes illustrated in FIGS. 1 through 3 and may include various shapes.

The vaporizer 14 may generate aerosol by heating a liquid composition and the generated aerosol may pass through the cigarette 2 to be delivered to a user. In other words, the aerosol generated via the vaporizer 14 may move along an air flow passage of the aerosol generating device 1 and the air flow passage may be configured such that the aerosol generated via the vaporizer 14 passes through the cigarette 2 to be delivered to the user.

For example, the vaporizer 14 may include a liquid storage, a liquid delivery element, and a heating element, but it is not limited thereto. For example, the liquid storage, the liquid delivery element, and the heating element may be included in the aerosol generating device 1 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14 or may be formed integrally with the vaporizer 14.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but it is not limited thereto.

Also, the aerosol generating device 1 may have a structure that introduces external air or discharge internal air even when the cigarette 2 is inserted into the aerosol generating device 1.

Although not illustrated in FIGS. 1 through 3, the aerosol generating device 1 and an additional cradle may form together a system. For example, the cradle may be used to charge the battery 11 of the aerosol generating device 1. Alternatively, the heater 13 may be heated when the cradle and the aerosol generating device 1 are coupled to each other.

The cigarette 2 may be similar to a general combustive cigarette. For example, the cigarette 2 may be divided into a first portion including an aerosol generating material and a second portion including a filter, etc. Alternatively, the second portion of the cigarette 2 may also include an aerosol generating material. For example, an aerosol generating material made in the form of granules or capsules may be inserted into the second portion.

The entire first portion may be inserted into the aerosol generating device 1, and the second portion may be exposed to the outside. Alternatively, only a portion of the first portion may be inserted into the aerosol generating device 1. Otherwise, the entire first portion and a portion of the second portion may be inserted into the aerosol generating device 1. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1. For example, opening and closing of the air passage and/or a size of the air passage may be adjusted by the user. Accordingly, the amount and smoothness of smoke may be adjusted by the user. As another example, the external air may flow into the cigarette 2 through at least one hole formed in a surface of the cigarette 2.

Hereinafter, an example of the cigarette 2 will be described with reference to FIGS. 4 and 5.

FIGS. 4 and 5 are diagrams showing examples of cigarettes.

Referring to FIG. 4, the cigarette 2 may include a tobacco rod 21 and a filter rod 22. The first portion 21000 described above with reference to FIGS. 1 through 3 may include the tobacco rod, and the second portion may include the filter rod 22.

FIG. 4 illustrates that the filter rod 22 includes a single segment. However, the filter rod 22 is not limited thereto. In other words, the filter rod 22 may include a plurality of segments. For example, the filter rod 22 may include a first segment configured to cool an aerosol and a second segment configured to filter a certain component included in the aerosol. Also, as necessary, the filter rod 22 may further include at least one segment configured to perform other functions.

The cigarette 2000 may be packaged using at least one wrapper 24. The wrapper 24 may have at least one hole through which external air may be introduced or internal air may be discharged. For example, the cigarette 2 may be packaged using one wrapper 24. As another example, the cigarette 2 may be double-packaged using at least two wrappers 24. For example, the tobacco rod 21 may be packaged using a first wrapper 241, and the filter rod 22 may be packaged using wrappers 242, 243, 244. In addition, the cigarette 2 may be repackaged by a single wrapper 245. When each of the tobacco rod 21 and the filter rod 22 includes a plurality of segments, each segment may be packaged using wrappers 242, 243, 244.

The tobacco rod 21 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21 may include other additives, such as flavors, a wetting agent, and/or organic acid. Also, the tobacco rod 21 may include a flavored liquid, such as menthol or a moisturizer, which is injected to the tobacco rod 21.

The tobacco rod 21 may be manufactured in various forms. For example, the tobacco rod 21 may be formed as a sheet or a strand. Also, the tobacco rod 21 may be formed as a pipe tobacco, which is formed of tiny bits cut from a tobacco sheet. Also, the tobacco rod 21 may be surrounded by a heat conductive material. For example, the heat-conducting material may be, but is not limited to, a metal foil such as aluminum foil. For example, the heat conductive material surrounding the tobacco rod 21 may uniformly distribute heat transmitted to the tobacco rod 21, and thus, the heat conductivity of the tobacco rod may be increased. As a result, the taste of the tobacco may be improved. Also, the heat conductive material surrounding the tobacco rod 21 may function as a susceptor heated by the induction heater. Here, although not illustrated in the drawings, the tobacco rod 21 may further include an additional susceptor, in addition to the heat conductive material surrounding the tobacco rod 21.

The filter rod 22 may include a cellulose acetate filter. Shapes of the filter rod 22 are not limited. For example, the filter rod 22 may include a cylinder-type rod or a tube-type rod having a hollow inside. Also, the filter rod 22 may include a recess-type rod. When the filter rod 22 includes a plurality of segments, at least one of the plurality of segments may have a different shape.

Also, the filter rod 22 may include at least one capsule 23. Here, the capsule 23 may generate a flavor or an aerosol. For example, the capsule 23 may have a configuration in which a liquid containing a flavoring material is wrapped with a film. For example, the capsule 23 may have a spherical or cylindrical shape, but is not limited thereto.

Referring to FIG. 5, the cigarette 3 may include a front-end plug 33. The front-end plug 33 may be located on a side of the tobacco rod 31, the side not facing the filter rod 32. The front-end plug 33 may prevent the tobacco rod 31 from being detached and may prevent the liquefied aerosol from flowing from the tobacco rod 31 into an aerosol generating device during smoking.

The filter rod 32 may include a first segment 321 and a second segment 322. Here, the first segment 321 may correspond to a first segment of the filter rod 22 of FIG. 4, and the second segment 322 may correspond to a third segment of the filter rod 22 of FIG. 4.

A diameter and a total length of the cigarette 3 may correspond to a diameter and a total length of the cigarette 2 of FIG. 4.

The cigarette 3 may be packaged by at least one wrapper 35. The wrapper 35 may have at least one hole through which external air flows in or internal gas flows out. For example, the front end plug 33 may be packaged by a first wrapper 351, the cigarette rod 31 may be packaged by a second wrapper 352, the first segment 321 may be packaged by a third wrapper 353, and the second segment 322 may be packaged by a fourth wrapper 354. Further, the entirety of the cigarette 3 may be repackaged by a fifth wrapper 355.

In addition, at least one perforation 36 may be formed in the fifth wrapper 355. For example, the perforation 36 may be formed in a region surrounding the cigarette rod 31 but is not limited thereto. The perforation 36 may serve to transfer heat generated by the heater 13 illustrated in FIGS. 2 and 3 to the inside of the cigarette rod 31.

In addition, at least one capsule 34 may be included in the second segment 322. Here, the capsule 34 may perform a function of generating flavor or a function of generating aerosol. For example, the capsule 34 may have a structure in which a liquid containing a fragrance is wrapped with a film. The capsule 34 may have a spherical or cylindrical shape but is not limited thereto.

FIG. 6 is a block diagram illustrating a hardware configuration of an aerosol generating device according to an embodiment.

An aerosol generating device 600 may include a controller 610, a heater 620, a battery 640, a memory 650, a sensor 660, and a user interface 670. According to embodiments, the aerosol generating device 600 may further include a vaporizer 630. The controller 610, the heater 620, the vaporizer 630, and the battery 640 illustrated in FIG. 6 may have similar configuration to the controller 12, the heater 13, the vaporizer 14, and the battery 11 of FIGS. 1 to 3. Thus, the description made with reference to FIGS. 1 to 3 may be applied to FIG. 6 in the same manner, and thus, duplicate description will be omitted.

However, one or more components illustrated in FIG. 6 may be omitted. The aerosol generating device 600 may be configured by more or less configuration elements than the configuration elements illustrated in FIG. 6.

The controller 610 controls the overall operation of the aerosol generating device 600. For example, the controller 610 may analyze and process sensing data acquired by the sensor 660. The controller 610 may start, stop, or continue to supply power from the battery 640 to the heater 620 and the vaporizer 630, based on the sensing data. The controller 610 may control the amount of power supplied to the heater 620 and the vaporizer 630 and a power supply time so that the heater 620 and the vaporizer 630 may be heated to a predetermined temperature or maintained at an appropriate temperature. In addition, the controller 610 may process various types of input information and output information of the user interface 670.

According to an embodiment, the controller 610 may measure the amount of power for heating the heater 620 and the vaporizer 630. For example, the controller 610 may acquire a current value measured by at least one element capable of measuring the current value input to the heater 620 and the vaporizer 630, and may calculate the amount of power by using the acquired current value. As another example, the controller 610 may acquire a voltage value measured by at least one element capable of measuring the voltage value input to the heater 620 and the vaporizer 630, and may calculate the amount of power by using the acquired voltage value. As another example, the controller 610 may acquire a current value and a voltage value measured by at least one element capable of measuring the current value and the voltage value input to the heater 620 and the vaporizer 630, and may calculate the amount of power by using the current value and the voltage value which are acquired. At least one element capable of measuring the current value and/or the voltage value may be configured integrally with the controller 610 or may be configured as a separate element.

According to an embodiment, the controller 610 may control heating operations of the heater 620 and the vaporizer 630 by comparing the measured amount of accumulated power of the heater 620 and the vaporizer 630 with a reference power amount stored in the memory 650. Detailed description thereof will be made below.

The battery 640 supplies power to be used for operating the aerosol generating device 600. That is, the battery 640 may supply power so that the heater 620 and the vaporizer 630 may be heated. In addition, the battery 640 may supply power necessary for operations of other components included in the aerosol generating device 600, such as the sensor 660, the user interface 670, the memory 650, and the controller 610. The battery 640 may be a rechargeable battery or a disposable battery. For example, the battery 640 may be a lithium polymer (LiPoly) battery but is not limited thereto.

The memory 650 is hardware that stores various data processed in the aerosol generating device 600 and may store data processed or to be processed by the controller 610. The memory 650 may be implemented with various types of memory, such as dynamic random access memory (DRAM), static random access memory (SRAM), read-only memory (ROM), electrically erasable programmable read-only memory (EEPROM), etc.

The memory 650 may store an operation time of the aerosol generating device 600, the maximum number of puffs, the current number of puffs, at least one temperature profile, a reference power amount, a history of power consumption, and/or data on a smoking pattern of a user.

The aerosol generating device 600 may include at least one sensor 660. A sensing result output by at least one sensor 660 is transferred to the controller 610, and the controller 610 may control the aerosol generating device 600 according to the sensing result to perform various functions such as controlling operations of the heater 620 and the vaporizer 630, restricting smoking, identifying insertion/non-insertion of a cigarette (or cartridge), and displaying a notification.

For example, at least one sensor 660 may include a puff detection sensor. The puff detection sensor may detect a user's puff based on a temperature change, a flow change, a voltage change, and/or a pressure change.

In addition, at least one sensor 660 may include a temperature detection sensor. The temperature detection sensor may detect a temperature of the heater 620 and the vaporizer 630. The aerosol generating device 600 may include a separate temperature sensor that detects a temperature of the heater 620. Alternatively, the heater 620 and the vaporizer 630 themselves may detect a temperature. In an embodiment, while the heater 620 and the vaporizer 630 function as temperature detection sensors, a separate temperature detection sensor may be further included in the aerosol generating device 600.

The user interface 670 may provide information on a state of the aerosol generating device 600 to a user. The user interface 670 may include various interfacing elements such as, a display or a lamp that outputs visual information, a motor that outputs tactile information, a speaker that outputs sound information, and terminals for data communication with input/output (I/O) interfacing elements (for example, buttons or a touch screen) that receives information input by a user or outputs information to the user or for receiving charging power, a communication interfacing module for performing wireless communication (for example, WI-FI, WI-FI Direct, Bluetooth, near-field communication (NFC), and so on) with external devices.

However, the aerosol generating device 600 may only include some of the various interfacing elements illustrated above.

Hereinafter, a method by which the controller 610 of the aerosol generating device 600 according to an embodiment controls an operation of the heater 620 will be described. For the sake of convenience, a method of controlling the operation of the heater 620 will be mainly described, and the method may be similarly applied to control an operation of the vaporizer 630.

If a signal requesting activation of the heater 620 is generated, the controller 610 starts a heating operation of the heater 620 by supplying power to the heater 620. For example, the signal requesting activation of the heater 620 may be a signal input by a user, a signal indicating insertion of a cigarette or a cartridge, etc., but is not limited thereto. In an embodiment, the heating operation of the heater 620 may vary according to the time of execution.

For example, the heating operation of the heater 620 may include a first heating operation, a second heating operation, and a third heating operation. The first heating operation may be preparing for a start of a user's puff by reaching a target temperature for a relatively short time from when power supply to the heater 620 is started. The second heating operation may be maintaining at a preset temperature for a preset first time period so that an appropriate amount of aerosol may be generated according to user's puffs. The third heating operation may be maintaining at a preset temperature so that aerosol may be generated according to a user's additional puff after the preset first time period expires.

Here, the preset first time period may be determined based on the average time that is normally taken for consuming a smoking article (for example, a cigarette or a cartridge) containing an aerosol generating material.

If the heating operation of the heater 620 is started, the controller 610 controls the heating operation of the heater 620 according to a previously stored temperature profile. The temperature profile may indicate proper temperatures of the heater 620 according to an elapse of time.

The controller 610 calculates a first power amount indicating a power amount used by the heater 620 during the first time period (i.e., between the heating start time point and the first time point). To this end, the controller 610 may calculate the power amount used by the heater 620 while controlling the heating operation of the heater 620 according to a predetermined temperature profile during the first period. For example, the controller 610 may check the amount of power that is used by the heater 620 during each predetermined time interval and add up to calculate the first power amount.

When the first time period expires, the controller 610 controls the heating operation of the heater 620 based on whether or not the calculated first power amount is greater than or equal to a preset reference power amount.

According to an embodiment, the reference power amount may be determined by the sum of a power amount PA indicating a power amount used by the heater 620 when there is no puff during the first time period and a power amount PB indicating a power amount used by the heater 620 for handing a predetermined number of puffs. The reference power amount may be pre-stored in the memory 650 of the aerosol generating device 600.

According to an embodiment, the power amounts PA and PB may be determined experimentally in advance, and may be stored in the memory 650. According to another embodiment, the power amount PB may be reset based on the accumulated smoking pattern data as a user uses the aerosol generating device 600. In this case, the reference power amount may also be reset to the sum of the reset power amount PB and the pre-stored power amount PA.

For example, the smoking pattern data may include at least one of a history of the amount of used power per puff, a history of the number of puffs occurred during the first time period, and a history of the total amount of used power by the puffs occurred during the first time period, and the controller 610 may reset the power amount PB by using at least one of the histories. In this case, resetting of the power amount PB may be periodically performed or may be performed as a signal for requesting resetting is input, but is not limited thereto.

According to an embodiment, when the calculated first power amount is greater than or equal to the reference power amount, the controller 610 may end the heating operation of the heater 620. For example, the controller 610 may end the heating operation of the heater 620 by stopping supply of power to the heater 620.

Moreover, when the calculated first power amount is less than the reference power amount, the controller 610 may continue the heating operation of the heater 620, based on a difference between the first power amount and the reference power amount so that a temperature of the heater 620 is maintained at a temperature lower than or equal to a temperature at the first time. As such, even when the accumulated amount of used power (i.e., the first power amount) is less than the reference amount of power, the user may continue smoking after the first time period expires. Since puff patterns such as a puff strength, a puff time, and a puff frequency are different for each user, users may not smoke sufficiently during the first time period that is determined experimentally or statistically. In this regard, an embodiment provides the user with an additional smoking time so that the maximum amount of smoking is allowed for one smoking article.

In addition, the controller 610 may calculate a second power amount indicating a power amount that is used by the heater 620 after the first time period expires. For example, the controller 610 may check the amount of power that is used by the heater 620 during each predetermined time interval and add up to calculate the second power amount. The controller 610 may continue the heating operation of the heater 620 until the second power amount reaches a difference value between the first power amount and the reference power amount. Hereinafter, a method by which the controller 610 continues the heating operation of the heater 620 will be described with reference to FIGS. 7 and 8.

FIGS. 7 and 8 are example diagrams of a temperature profile of the heater according to an embodiment. In other words, FIGS. 7 and 8 illustrate changes in temperature of the heater 620 according to an elapse of time from when the heating operation of the heater 620 is started to when the heating operation is ended. However, this is only an example and the graph may variously change depending on embodiments.

Referring to FIG. 7, the controller 610 may control the heater 620 so that a temperature of the heater 620 rises from the ambient temperature to a first temperature T1 during a first period 710. The first temperature T1 is a temperature suitable for vaporizing an aerosol generating material and may change depending on smoking environment (for example, a temperature, a pressure, humidity, a smoking pattern of a user, air composition, and so on) within a preset allowable temperature range. The heating operation of the heater 620 during the first period 710 may correspond to a first heating operation described above.

During a second period 720, the controller 610 may control the heater 620 so that the temperature of the heater 620 is reduced to and maintained at a second temperature T2. The second temperature T2 may be within the allowable temperature range and may be lower than the first temperature T1. The second temperature T2 may be maintained until a preset first time point t1 (i.e., until the first time period expires). The heating operation of the heater 620 during the second period 720 may correspond to the second heating operation described above.

If the first power amount (i.e., the power amount consumed by the heater 620 between the heating start time point and the first time point t1) is less than the reference power amount, the controller 610 may control the heater 620 so that the temperature of the heater 620 is maintained at the temperature T2 during a third period 730. The heating operation of the heater 620 during the third period 730 may correspond to the third heating operation described above. The third operation may continue until a second time point t2. For example, the second time point t2 may indicate when the second power amount reaches a difference between the first power amount and the reference power amount.

During the third period 730, the temperature of the heater 620 is maintained at the same temperature as the temperature T2, and thus, the amount and quality of atomization of the second period 720 may be maintained during the third period 730.

The controller 610 may end the heating operation of the heater 620 after the second time point t2.

Referring to FIG. 8, during the first period 810, the controller 610 may control the heater 620 so that the temperature of the heater 620 rises from the ambient temperature to the first temperature T1. As described above with reference to FIG. 7, the first temperature T1 may be a temperature suitable for vaporizing an aerosol generating material and may change depending on smoking environment within a preset allowable temperature range. The heating operation of the heater 620 during the first period 810 may correspond to the first heating operation described above.

During the second period 820, the controller 610 may control the heater 620 so that the temperature of the heater 620 is reduced from the first temperature T1 to the second temperature T2. The second temperature T2 may be within the allowable temperature range and may be lower than the first temperature T1. The second temperature T2 may be maintained until a preset first time point t1. The heating operation of the heater 620 during the second period 820 may correspond to the second heating operation described above.

If the first power amount is less than the reference power amount, the controller 610 may control power supply to the heater 620 so that the temperature of the heater 620 is reduced to and maintained at a third temperature T3 during the third period 830. During the third period 830, the heating operation of the heater 620 may correspond to the third heating operation described above and may be continued until the second time point t2. For example, the second time t2 may indicate when the second power amount reaches a difference value between the first power amount and the reference power amount.

According to an embodiment, the greater the difference value between the first power amount and the reference power amount is, the lower the temperature T3 may be. However, the third temperature T3 may be set within a preset allowable temperature range. Here, the allowable temperature range may be a temperature suitable for vaporizing an aerosol generating material. For example, the allowable temperature range may be set to a temperature range in which the amount and quality of atomization is maintained without causing carbonization.

Since the temperature of the heater 620 during the third period 830 is maintained lower than the temperature T2, it is possible to prevent the heater 620 from being overheated and carbonized due to depletion of the aerosol generating material. As such, degradation of smoking quality may also be prevented.

The controller 610 may end the heating operation of the heater 620 after the second time point t2.

According to an embodiment, respective periods 710, 720, 730, 810, 820, and 830 of FIGS. 7 and 8 may be further divided into a plurality of periods, and the controller 610 may control the heating operation of the heater 620 so that the temperature of the heater 620 is maintained at a preset temperature corresponding to each of the plurality of periods. In some embodiments, the preset temperature in one or more of the plurality of periods may increase or decrease gradually. Also, the preset temperature in one or more of the plurality of periods may increase and then decrease or may decrease and then increase.

For example, during the third periods 730 and 830, the controller 610 may maintain the temperature of the heater 620 at the temperature T2 from the first time t1 for a predetermined time period, and then maintain the temperature of the heater 620 at a temperature T3 lower than the temperature T2 after the predetermined time. Here, the predetermined time may be selected by the controller 610 according to smoking environment (for example, a temperature, a pressure, humidity, a smoking pattern of a user, air composition, and so on) that is determined based on information output by the sensor 660 or retrieved from the memory 650.

FIGS. 9 and 10 are flowcharts illustrating an operation method of an aerosol generating device, according to an embodiment.

Referring to FIG. 9, the aerosol generating device 600 starts a heating operation of the heater 620 that heats an aerosol generating material in step S910. If a signal for requesting activation of the heater 620 is generated, the aerosol generating device 600 may start a heating operation of the heater 620 by supplying power to the heater 620.

In step S920, the aerosol generating device 600 calculates a first power amount indicating a power amount that has been used by the heater 620 from a point in time when the heating operation of the heater 620 is started (i.e., since the heating start time point). The aerosol generating device 600 may calculate the first power amount while controlling the heating operation of the heater 620 according to a predetermined temperature profile, until a preset first time period expires. For example, the aerosol generating device 600 may check the amount of power that is used by the heater 620 during each predetermined time interval and add up to calculate the first power amount.

In step S930, the aerosol generating device 600 determines whether or not a preset first time period elapsed after the heating operation of the heater 620 was started.

When the preset first time period did not elapse yet, the aerosol generating device 600 continues to calculate the first power amount and heats the heater 620 according to the preset temperature profile until the first time period expires.

If the preset first time period elapses, the aerosol generating device 600 determines whether or not the first power amount is greater than or equal to a preset reference power amount in step S940. Step S940 may be performed by real-time monitoring of the aerosol generating device 600 or may be performed at predetermined time intervals. The aerosol generating device 600 may control the heating operation of the heater 620 according to the determination result in step S940.

If the first power amount is greater than or equal to the reference power amount, the aerosol generating device 600 ends the heating operation of the heater 620 in step S950. For example, the aerosol generating device 600 may end the heating operation of the heater 620 by stopping supply of power to the heater 620.

If the first power amount is less than the reference power amount, the aerosol generating device 600 continues the heating operation of the heater 620 based on a difference value between the first power amount and the reference power amount so that a temperature of the heater 600 is maintained at a temperature lower than or equal to the temperature at the first time point (i.e., at the time point when the first time period expired).

FIG. 10 is a flowchart illustrating a method of continuing the heating operation of the heater 620 according to step S960 of FIG. 9.

In step S1010, the aerosol generating device 600 calculates the second power amount indicating a power mount that has been used by the heater 620 since the preset first time period expired. After the first time period expires, the aerosol generating device 600 may calculate the second power amount while controlling the heating operation of the heater 620 according to a predetermined temperature profile. For example, the aerosol generating device 600 may check the amount of power that is used by the heater 620 during each predetermined time interval and add up to calculate the second power amount.

In step S1020, the aerosol generating device 600 determines whether or not the calculated second power amount reaches a difference value between the first power amount and the reference power amount. Step S1020 may be performed by real-time monitoring of the aerosol generating device 600 or may be performed at predetermined time intervals.

If the second power amount is less than the difference value between the first power amount and the reference power amount, the aerosol generating device 600 continues to calculate the second power amount and continues to heat the heater 620.

If the second power amount reaches the difference value between the first power amount and the reference power amount, the aerosol generating device 600 may selectively perform step S1030 or step S1040. Alternatively, the aerosol generating device 600 may perform steps S1030 and S1040 sequentially or alternately.

In step S1030, the aerosol generating device 600 continues the heating operation of the heater 620 so that the temperature of the heater 620 is maintained at a temperature at the first time point (i.e., at a point in time when the first time period expires).

In step S1040, the aerosol generating device 600 continues the heating operation of the heater 620 so that the temperature of the heater 620 is maintained at a temperature lower than the temperature at the first time point.

The content described with reference to FIGS. 7 and 8 may also be applied to steps S1030 and S1040 in the same manner.

Moreover, the operation method of the aerosol generating device described above may be generated as a program executable on a computer and may be performed by a general-purpose digital computer that executes the program by using a computer-readable recording medium. In addition, a structure of data used in the operation method of the aerosol generating device described above may be recorded on a computer-readable recording medium through various elements. The computer-readable recording medium includes a storage medium such as a magnetic storage medium (for example, ROM, RAM, USB, floppy disk, hard disk, or so on) or an optical read medium (for example, CD-ROM, DVD, or so on).

At least one of the components, elements, modules or units (collectively "components" in this paragraph) represented by a block in the drawings such as the controller 610 and the user interface 670 in FIG. 6, may be embodied as various numbers of hardware, software and/or firmware structures that execute respective functions described above, according to an example embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above example embodiments may be implemented in algorithms that execute on one or more processors. Furthermore, the components represented by a block or processing steps may employ any number of related art techniques for electronics configuration, signal processing and/or control, data processing and the like.

Those skilled in the art relating to the present embodiments may understand that the embodiments may be changed in various forms without departing from the essential characteristics described above. Therefore, the disclosed methods should be considered in a descriptive point of view not a restrictive point of view. The scope of the present disclosure is described in the claims rather than the foregoing description, and all differences within the equivalent range should be interpreted as being included in the present disclosure.

The invention claimed is:

1. An aerosol generating device comprising:
   a heater configured to heat an aerosol generating material;
   a controller configured to:
      calculate a first power amount indicating a power amount used by the heater during a preset first time period after a heating operation of the heater is started, and
      control the heating operation of the heater based on whether the first power amount is greater than or equal to a preset reference power amount,
   wherein the controller is further configured to:
      end the heating operation of the heater, when the first time period expired and the first power amount is greater than or equal to a reference power amount, and
      continue the heating operation of the heater based on a difference between the first power amount and the reference power amount when the first time period expired and the first power amount is less than the reference power amount,
   wherein during the preset first time period, the first power amount is calculated while controlling the heating operation of the heater according to a predetermined temperature profile.

2. The aerosol generating device of claim 1, wherein the controller is further configured to:
   based on the first power amount less than the reference power amount, continue the heating operation of the heater based on the difference between the first power amount and the reference power amount so that a temperature of the heater is maintained lower than or equal to a temperature of the heater when the first time period expired.

3. The aerosol generating device of claim 2, wherein the controller is further configured to:
   based on the first power amount less than the reference power amount, maintain the temperature of the heater at the temperature of the heater when the first time period expired, until a second power amount indicating a power amount used by the heater after the first time period expired reaches the difference.

4. The aerosol generating device of claim 2, wherein the controller is further configured to:
   based on the first power amount less than the reference power amount, maintain the temperature of the heater lower than the temperature of the heater when the first time period expired, until a second power amount indicating a power amount used by the heater after the first time period expired reaches the difference.

5. The aerosol generating device of claim 4, wherein the temperature of the heater that is maintained until the second power amount reaches the difference is inversely proportional to the difference.

6. The aerosol generating device of claim 1, further comprising:
   a memory configured to store smoking pattern data acquired as a user uses the aerosol generating device,
   wherein the controller resets the reference power amount based on the smoking pattern data.

7. An operation method of an aerosol generating device, the operation method comprising:
   starting a heating operation of a heater that heats an aerosol generating material;
   calculating a first power amount indicating a power amount used by the heater during a preset first time period after the heating operation of the heater is started; and
   controlling the heating operation of the heater based on whether the first power amount is greater than or equal to a preset reference power amount,
   wherein the controlling the heating operation of the heater comprises
      ending the heating operation of the heater, when the first time period expired and the first power amount is greater than or equal to a reference power amount, and
      continuing the heating operation of the heater based on a difference between the first power amount and the reference power amount when the first time period expired and the first power amount is less than the reference power amount, and
   wherein during the preset first time period, the first power amount is calculated while controlling the heating operation of the heater according to a predetermined temperature profile.

8. The operation method of claim 7, wherein the continuing the heating operation of the heater comprises:
   based on the first power amount less than the reference power amount, continuing the heating operation the heater based on the difference between the first power amount and the reference power amount so that a temperature of the heater is maintained lower than or equal to a temperature of the heater when the first time period expired.

9. The operation method of claim 8, wherein the continuing the heating operation of the heater comprises:
   based on the first power amount less than the reference power amount, maintaining the temperature of the heater at the temperature of the heater when the first time period expired, until a second power amount indicating a power amount used by the heater after the first time period expired reaches the difference.

10. The operation method of claim 8, wherein the continuing the heating operation of the heater comprises:
    based on the first power amount less than the reference power amount, maintaining the temperature of the heater lower than the temperature of the heater when the first time period expired, until a second power amount indicating a power amount used by the heater after the first time period expired reaches the difference.

11. The operation method of claim 10, wherein the temperature of the heater that is maintained until the second power amount reaches the difference is inversely proportional to the difference.

12. The operation method of claim 7, further comprising:
storing smoking pattern data acquired as a user uses the aerosol generating device; and
resetting the reference power amount based on the smoking pattern data.

13. A non-transitory computer-readable recording medium having recorded thereon a program for executing the method of claim 7 on a computer.

* * * * *